(12) United States Patent
Herrmann

(10) Patent No.: US 10,752,176 B2
(45) Date of Patent: *Aug. 25, 2020

(54) ASSEMBLY FOR ADJUSTING AN OUTSIDE REARVIEW DEVICE

(71) Applicant: SMR Patents S.à.r.l., Luxembourg (LU)

(72) Inventor: Andreas Herrmann, Winnenden-Baach (DE)

(73) Assignee: SMR Patents S.á.r.l., Luxembourg (LU)

( * ) Notice: Subject to any disclaimer, the term of this patent is extended or adjusted under 35 U.S.C. 154(b) by 268 days.

This patent is subject to a terminal disclaimer.

(21) Appl. No.: 15/410,555

(22) Filed: Jan. 19, 2017

(65) Prior Publication Data

US 2017/0190289 A1    Jul. 6, 2017

Related U.S. Application Data

(63) Continuation-in-part of application No. 14/122,066, filed as application No. PCT/EP2012/059396 on May 21, 2012, now Pat. No. 9,580,016.

(30) Foreign Application Priority Data

May 31, 2011 (DE) .......... 10 2011 103 198

(51) Int. Cl.
  *B60R 1/072* (2006.01)
  *B60R 1/12* (2006.01)
  *B60K 35/00* (2006.01)

(52) U.S. Cl.
  CPC ............ *B60R 1/072* (2013.01); *B60R 1/12* (2013.01); *B60K 2370/797* (2019.05); *B60R 2001/1215* (2013.01)

(58) Field of Classification Search
  CPC ......... B60R 1/025; B60R 1/06; B60R 1/0607; B60R 1/0612; B60R 1/062; B60R 1/07072; B60R 1/00–10; B60R 1/072; B60R 1/12; B60R 2001/1215; B60K 2370/797
  USPC ................................. 359/843, 871–877, 849
  See application file for complete search history.

(56) References Cited

U.S. PATENT DOCUMENTS

| | | | | |
|---|---|---|---|---|
| 4,666,264 A | * | 5/1987 | Yamabe | B60R 1/02 359/883 |
| 5,844,721 A | * | 12/1998 | Karpen | B60R 1/083 359/603 |
| 6,069,420 A | * | 5/2000 | Mizzi | F15B 11/128 310/15 |
| 6,398,376 B2 | * | 6/2002 | Englander | B60R 1/0605 359/864 |
| 9,580,016 B2 | * | 2/2017 | Herrmann | B60R 1/072 |

(Continued)

FOREIGN PATENT DOCUMENTS

EP        0460666      * 12/1991    ............... B60R 1/06

*Primary Examiner* — George G King
(74) *Attorney, Agent, or Firm* — Jones Day

(57) ABSTRACT

An adjustment assembly for adjusting the reflecting surface of a glass assembly in an external rearview vehicle mirror, where two linear adjusting motors act on two points of the glass assembly, where the adjusting motors are positioned between the glass assembly and a mirror carrier in the mirror head. The adjusting motors are connected to the glass assembly and/or the mirror carrier via at least one elastomeric connecting piece.

14 Claims, 6 Drawing Sheets

(56) References Cited

U.S. PATENT DOCUMENTS

| | | | |
|---|---|---|---|
| 2004/0118232 A1* | 6/2004 | Wolf | B60R 1/072 |
| | | | 74/89 |
| 2004/0125476 A1* | 7/2004 | Boddy | B60R 1/072 |
| | | | 359/879 |
| 2005/0213229 A1* | 9/2005 | Cofer, Jr. | B60R 1/025 |
| | | | 359/843 |
| 2006/0176591 A1* | 8/2006 | Peterson | B60R 1/062 |
| | | | 359/877 |
| 2008/0152333 A1* | 6/2008 | Yamasaki | G02B 27/646 |
| | | | 396/55 |

* cited by examiner

ASSEMBLY FOR ADJUSTING AN OUTSIDE REARVIEW DEVICE

CROSS-REFERENCE TO RELATED APPLICATIONS

This application is a continuation in part of U.S. patent application Ser. No. 14/122,066, filed Dec. 16, 2013, which is a national stage entry of International Patent Application No. PCT/EP2012/059396, filed May 21, 2012, which claims the benefit of priority of German Patent Application No. 10 2011 103 198.0, filed May 31, 2011, the disclosures of each of which is incorporated herein by reference in its entirety for all purposes.

FIELD OF INVENTION

The invention relates to an external rearview device of a vehicle, in particular to an adjustment assembly for such an external rearview device.

BACKGROUND OF THE INVENTION

External rearview vehicle mirrors increasingly comprise electrical means for adjusting the glass. Glass actuators in a built-in casing are used as independent components for this purpose. These glass actuators include two motors that drive adjustment systems. Alternatively, separate drives can be used.

In the known external vehicle mirrors that can be electrically actuated, a mirror carrier that can be tilted is attached to a housing and two drive motors are coupled with the mirror carrier. The drive motors are attached at a 90° offset with reference to the pivot points of the mirror carrier. They are designed as rotary electric motors and move the mirror via a transmission and gear racks and their counterparts attached to the mirror carrier. The tilting motion can in principle be implemented using a single motor, but this would require an increased mechanical effort. A simple design can be achieved using two motors.

Due to the many parts (motors, transmissions, gear racks, etc.), the assembly effort required is considerable even if two rotary electric motors are used.

DE 40 18 409 A1 describes an arrangement in which hinged linear motors are used for adjusting the mirror glass. The solution uses rotor bars on ball bearings and electric linear motors for adjusting the mirror.

A non-generic adjustment assembly without linear adjusting motors is known from WO 2005/095 159 A1.

A method for manufacturing an adjustment assembly is known from WO 03/004 245 A1.

SUMMARY OF THE PRESENT INVENTION

The invention is based on the problem to provide an external rearview vehicle mirror of the type mentioned above that can be actuated electrically, has a simple mechanical design, and can be manufactured cost-effectively.

This problem is solved according to the invention in that the drive motors are designed as molded-on electric linear motors and in that these linear motors are actuated by a controller located in the external rearview mirror.

This problem is also solved by an adjustment assembly in an external rearview device of a vehicle comprising a head comprising a glass or display and glass and display subassembly and a carrier; and at least two linear adjusting motors acting on at least two points of the subassembly, wherein the adjusting motors are positioned between the subassembly and the carrier in the head, wherein the adjusting motors are connected to the subassembly and the carrier via at least one at least partically elastomeric connecting piece, and wherein the adjustment assembly adjusts the subassembly.

In one example, the adjustment assembly comprises at least a first coupling pin and a second coupling pin, wherein a first end of the first and second coupling pin is attached to the two points of the single reflective mirror element of the subassembly to enable the two linear adjusting motors to act on the two points.

In the afore mentioned example, the first linear adjusting motor acts on a first friction surface arranged on the first coupling pin, and the second linear adjusting motor acts on a second friction surface arranged on the second coupling pin.

Also, in one example, the coupling pins and the linear adjusting motors provide a first and a second friction joint for frictional engagement between the first and second linear adjusting motor and the first and second coupling pin, respectively.

In one example, the adjusting motors are piezo motors.

In the afore mentioned example, the linear adjusting motors comprise at least one finger element, preferably a spring biased finger element, wherein the finger element is adapted to act on the friction surface of the respective coupling pin for moving the first and second coupling pin up or down relative to the mirror carrier.

In one example, the friction surface comprises at least one friction element, preferably a plurality of friction elements.

In the afore mentioned example, the friction element fulfills the function of a guiding element, in particular in form of a rail.

In one example, the friction surface is arranged on the coupling pins in a longitudinal direction of the coupling pins between a first end and second end of the coupling pins.

It is preferred that each friction surface and the respective coupling pin end have complementary shapes to engage each other.

In another example, the friction surface has at least one of a concave shape or convex shape or saw tooth.

In one example, the first and second coupling pins are connected to the subassembly via at least one elastomeric connection piece.

It is preferred that the adjusting motors comprise rotors or coupling pins that are extension coated with at least one elastomeric connecting piece.

In another example, the adjusting motors are actuated using a controller built into the external rearview device.

In the afore mentioned example, the controller is part of a vehicle electrical routing bus system.

In one example, the subassembly comprises a glass assembly having a plastic substrate with a reflecting layer.

In another example, the subassembly comprising a glass assembly having a plastic carrier plate with a mineral mirror glass. It is also possible to use both, the plastic substrate with a reflecting layer and a mineral mirror glass.

Still further, the carrier provides a counter bearing surface for each coupling pin.

It is preferred that each counter bearing surface is provided by a carrier element arranged on the side of each respective coupling pin opposite the respective linear adjusting motor.

Advantageously, it has been found that the adjustment assembly according to the above described embodiment of the invention does not need to employ a gear box system with a clutch, since the linear adjusting motors act directly on the coupling pins that are attached to the glass assembly. Therefore, an adjustment assembly can be utilized that uses less parts, is lighter than the designs that are known from the prior art, and operates almost silently.

By employing piezo motors, the reflecting plane can be moved in very fine steps, and at high speeds.

Also, by utilizing a finger element to act on the friction surface of the of the coupling pin, the finger element can accurately move or crawl up and down the friction surface of the coupling pin, so that the position of the finger element relative to the coupling pin can be very precisely adjusted, and re-adjusted.

As already addressed above, each coupling pin and its respective linear adjusting motor provide a friction joint for frictional engagement between the linear adjusting motor and the coupling pin. Therefore, no separate friction elements need to be employed.

Also, it has been advantageously shown that good results can be achieved when the linear adjusting motor, and/or the finger element is/are arranged in an essentially diagonal direction, preferably at an angle of approximately 45°, relative to the coupling pin. By using this arrangement optimal friction can be achieved, and hence optimal adjustability of the reflecting surface is provided by the adjusting assembly.

Also, advantageously it has been shown that complementary shapes of the finger elements, or rather their ends, and the friction surfaces provide an improved frictional engagement. The frictional engagement can be further improved when the friction surface has a concave or convex shape or is provided with saw tooth.

Also, in another advantageous example of the invention, the first and second linear adjusting motors are actuated using a controller built into the external rearview vehicle mirror. This advantageously provides an interface of the bus system of the vehicle. Also, the adjustment assembly can be advantageously used with a wide variety of electronic devices for rear view devices.

Further, the glass assembly could be a lightweight plastic substrate with a reflecting layer that is easier to move.

BRIEF DESCRIPTION OF THE DRAWINGS

Embodiments of the invention will be explained below with reference to the figures. Wherein.

DETAILED DESCRIPTION OF THE INVENTION

Figure 1:
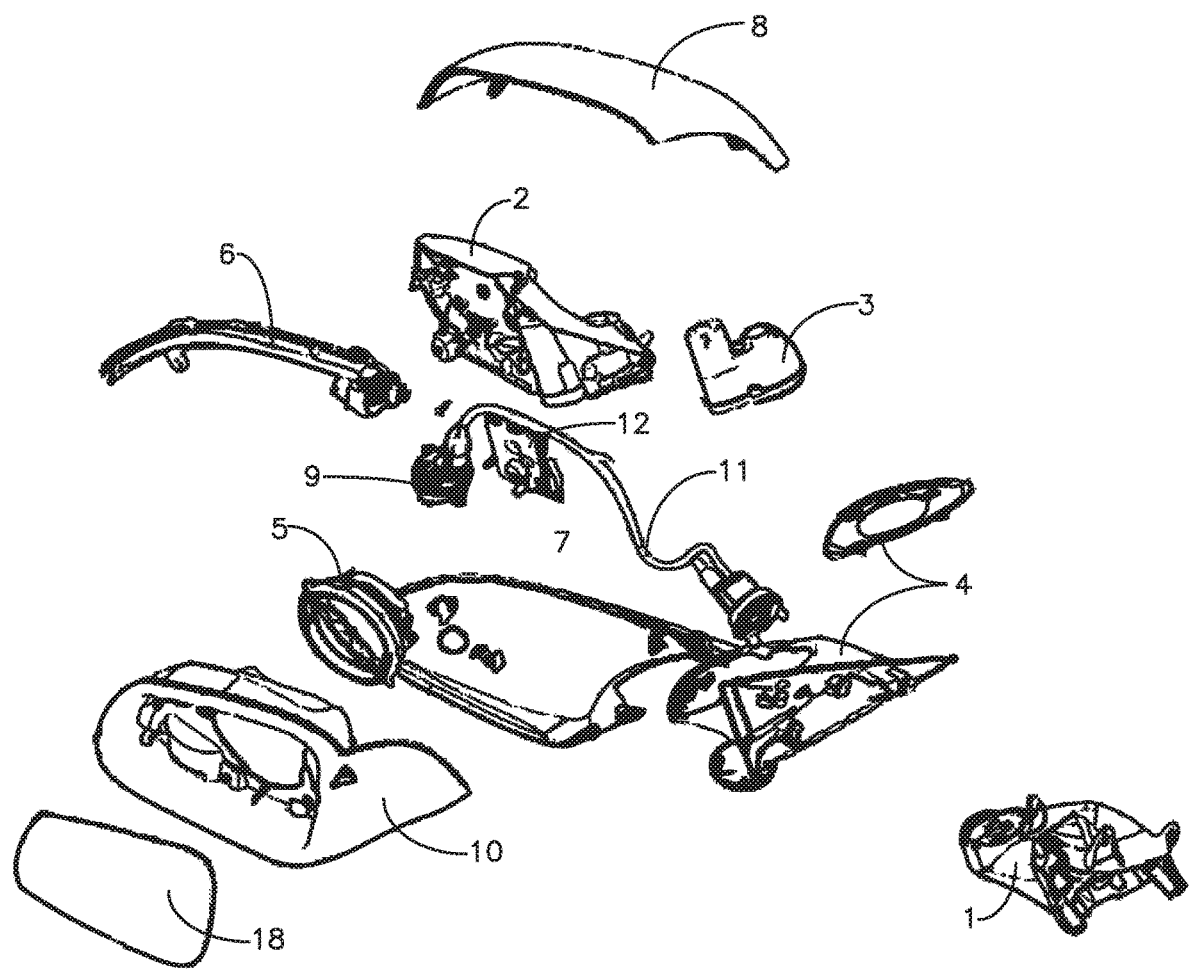
FIG. 1 shows an exploded view of an external rearview mirror.

The invention will be described below for an external rearview vehicle mirror. FIG. 1 shows an external rearview mirror arrangement as used in prior art. The external mirror consists of a mirror head and mirror base 1, wherein the mirror head is rotatably mounted to the mirror base 1. In FIG. 1, the mirror base 1 is connected to a pivot pin 3 and via said pivot pin 3 to a mirror carrier 2 in the mirror head. These components are made of metal or plastic or a combination of these two materials and represent the load-bearing structure of the external rearview mirror.

The mirror base 1 is mounted to the vehicle. It is covered by plastic components, the mirror base covers 4.

A glass drive assembly 5 is mounted to the mirror carrier 2 and connected to a glass assembly 18. The glass assembly 18 can consist of a conventional glass mirror with a carrier plate made of plastic that protects and carries the glass and establishes the connection to the glass drive assembly 5. In an advantageous embodiment, the glass assembly 18 may also be made of plastic glass, that is, a mirror glass made of a coated plastic substrate with a reflecting side and a carrier side into which the fastening means for the glass drive assembly 5 are integrated. The mirror head is covered by the mirror head housing components 7, 8, and 10. In the example shown in FIG. 1, a turn signal module 6 is also integrated in the mirror head housing components 7, 8, and 10. An actuator 9 for the glass drive assembly 5 is connected to a controller 12, which itself comprises a connection 11 to the vehicle.

The glass drive assembly 5 as an assembly in its own right contains two motors that engage in gear racks, the ends of which are attached to the glass assembly 18 and can therefore pivot the mirror glass. Glass drive assemblies 5 are delivered as a complete unit in suitable housings.

Figure 2:
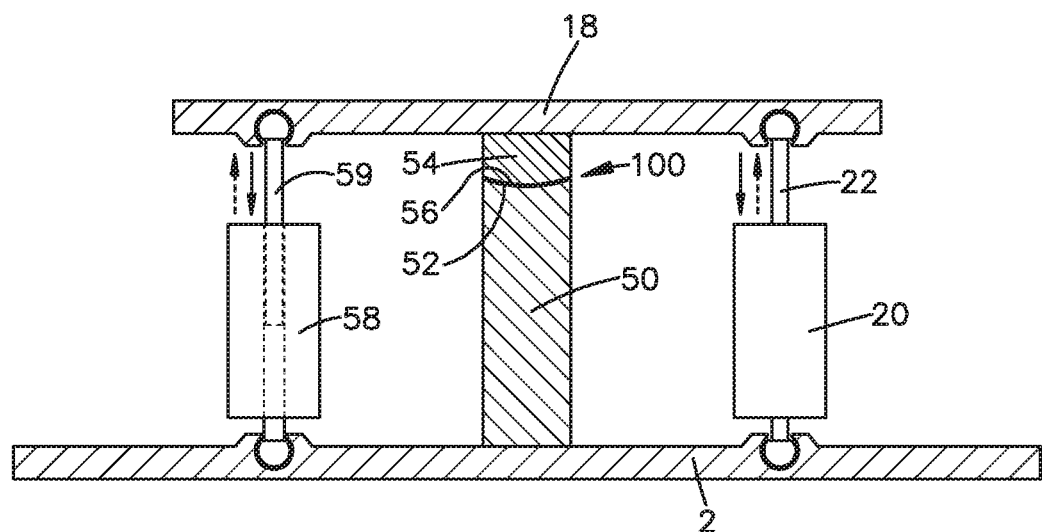
FIG. 2 shows an embodiment with linear motors according to prior art.

Alternatively, FIG. 2 shows a known adjustment assembly with separate drives.

According to FIG. 2, a tilting bearing 100 that comprises a support 50 on the mirror carrier 2 and a block 54 on the back side of the glass assembly 18 is installed between the glass assembly 18 and the mirror carrier 2. The support 50 has a concave bearing shell 52 that receives a convex bearing surface 56 of the block 54. A linear adjusting motor 20 is shown on the right in FIG. 2. One of its ends is pivoted in a recess of the mirror carrier 2. A rotor 22 of the motor 20 is articulated to the rear side of the glass assembly 18 by means of a ball joint.

The bearing elements 52, 56 define a pivot point M. A friction element 58 is arranged symmetrically to this pivot point M on the side opposite the linear adjusting motor 20 and pivoted like the adjusting motor 20. The friction element 58 is a cylindrical friction element 58 and defines a specific static friction as well as a specific dynamic friction between its axle 59 and the body surrounding the axle 59.

If the linear adjusting motor 20 moves the rotor 22 in the direction of the continuous arrow, the mirror carrier 2 tilts counterclockwise about the tilting bearing 100, wherein the axle 59 dips into the friction element 58 in the direction of the extended arrow. If the rotor 22 is retracted, the mirror carrier 2 tilts clockwise, and the rotor 22 and the axle 59 of the friction element 58 then move in the direction of the dashed arrows.

A similar arrangement as shown in FIG. 2 is provided for the other tilting axis, such that a similar image results when looking at the arrangement according to FIG. 2 from an angle offset by 90°.

This prior art solution requires sophisticated friction elements in addition to the linear adjusting motor 20.

Figure 3:
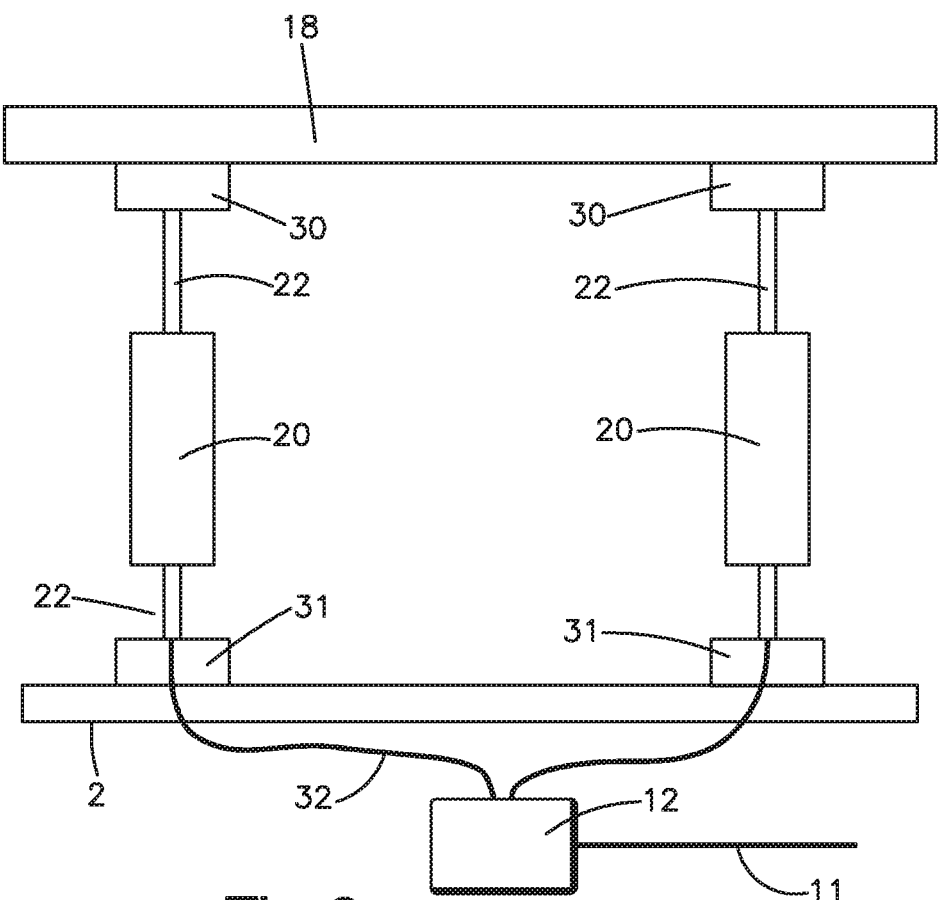
FIG. 3 shows a first embodiment of the adjustment assembly according to the invention.

FIG. 3 shows an adjustment assembly according to the invention. The tilting bearing was left out of this depiction. Any bearing that defines a center of articulation between the glass assembly 18 and the mirror carrier 2 is suitable for executing the invention. An expert skilled in the art may use any solution he or she is familiar with.

The glass assembly 18 is therefore connected to the mirror carrier 2 via a bearing not shown here and two linear adjusting motors 20.

Each linear adjusting motor 20 with a rotor 22, 22' is equipped with an elastomeric connecting piece 31 at its end. On its other end, the rotor 22, 22' is connected to another elastomeric connecting piece 30 that is linked to the glass assembly 18. An electrical connection 32 extends from the linear adjusting motor 20 to a controller 12 that has a connection 11 to the vehicle.

The two drives shown are arranged at an offset, such that actuation of the linear extension or reduction of the rotors 22, 22' can bring about any desired positioning.

It is preferred that linear adjusting motors with piezo motors are used. These replace the classic drive systems such as motor spindle systems or magnetic linear motors. The piezoelectric positioners consist of a rotor that is preloaded by piezo motors. Piezoelectric positioners fit into highly compact designs, and rapid adjustment is an advantage. Furthermore, piezoelectric positioners have a high degree of self-locking, and if they are used as mirror glass positioners they ensure that the glass assembly 18 is securely supported and locked. Additional locking mechanisms can be eliminated.

The embodiment according to the invention in which the glass assembly 18 does not contain a mirror made of mineral glass but a plastic substrate onto which a metal layer is deposited is particularly advantageous. For this purpose, a plastic substrate of high optical quality is produced and a metallic layer, for example, chromium, aluminum, or titanium or a mixture, is deposited onto one or both surfaces of the plastic substrate using a suitable method. Plastic mirrors are by several orders of magnitude lighter than conventional glass mirrors. They can easily be guided by the glass positioners, and the piezoelectric positioners do not need to be designed for large adjusting forces, which makes the entire design more lightweight and cost-effective.

The adjustment assembly consists of the glass assembly 18, two linear adjusting motors 20, and the connecting pieces 31 and 30 to the mirror carrier 2 and to the glass assembly 18.

The adjustment assembly is manufactured in an injection molding process. In a first step, the adjusting motor 20 is equipped with an elastomeric connecting piece 31 on the side that will later have be connected to the mirror carrier 2. It can be molded directly onto the motor.

Alternatively, the connecting piece 31 can be mounted onto the motor.

In another step, either a plastic mirror is manufactured or a glass carrier plate is injection molded for the glass assembly 18. For the plastic mirror, a substrate is manufactured in a special injection molding process that is described in EP 1 412 158 A0. The connecting element 30 is then directly molded onto the plastic substrate in another injection molding step after the linear adjusting motor 20 with its rotor 22 was placed in the die. The linear adjusting motor 20 with its rotor is placed at a defined distance from the plastic substrate or the carrier plates into the second injection molding die such that this distance is filled with elastomeric material in an extrusion coating process and the two components are joined. The rotor 22 is directly molded onto the plastic substrate of the plastic mirror, resulting in a positive and friction-locked joint. The assembling effort is eliminated by directly joining the linear adjusting motor 20 with the glass assembly 18. The connecting piece 30 is made of an elastomeric material so that the angle between the glass assembly 18 and the rotor 22 can adapt to the adjusting forces up to a threshold value determined by the elasticity coefficient of the material.

The plastic injection molding method is either a 2K method in an injection molding machine wherein the components are manufactured in two dies and using two materials, or the carrier plate or the plastic mirror are manufactured in a separate process and inserted into a second plastic injection molding machine and equipped with the connecting pieces.

It is useful, in particular, when using plastic mirrors, that the depositing step is performed before the connecting piece is molded onto the linear adjusting motors.

The components consisting of the glass assembly 18 and the linear adjusting motors are assembled by means of the connecting pieces 31, which are clipped into suitable devices of the mirror carrier 2 or fastened in another way. The bearing is therefore designed such that the bearing components are joined when connecting the linear adjusting motors 20.

Both linear adjusting motors 20 are actuated to adjust the mirror. They are actuated by means of contacting and connection to a controller. Such a controller 12 in the external rearview mirror is used for actuating all electrical functions available in the external rearview mirror. Advantageously, the control functions are performed by a controller 12 that is also used as a LIN bus node. In this way, the controller 12 is directly connected to the vehicle bus and its nodes via the bus connection.

Since a controller 12 is used, the two linear adjusting motors 20 can be actuated such that the two linear adjusting motors are not moved separately but in a coordinated manner relative to one another. In this way, tilting of the rotor axle and the resulting strain on the elastomeric connecting pieces by shear forces can be prevented.

Figure 4:
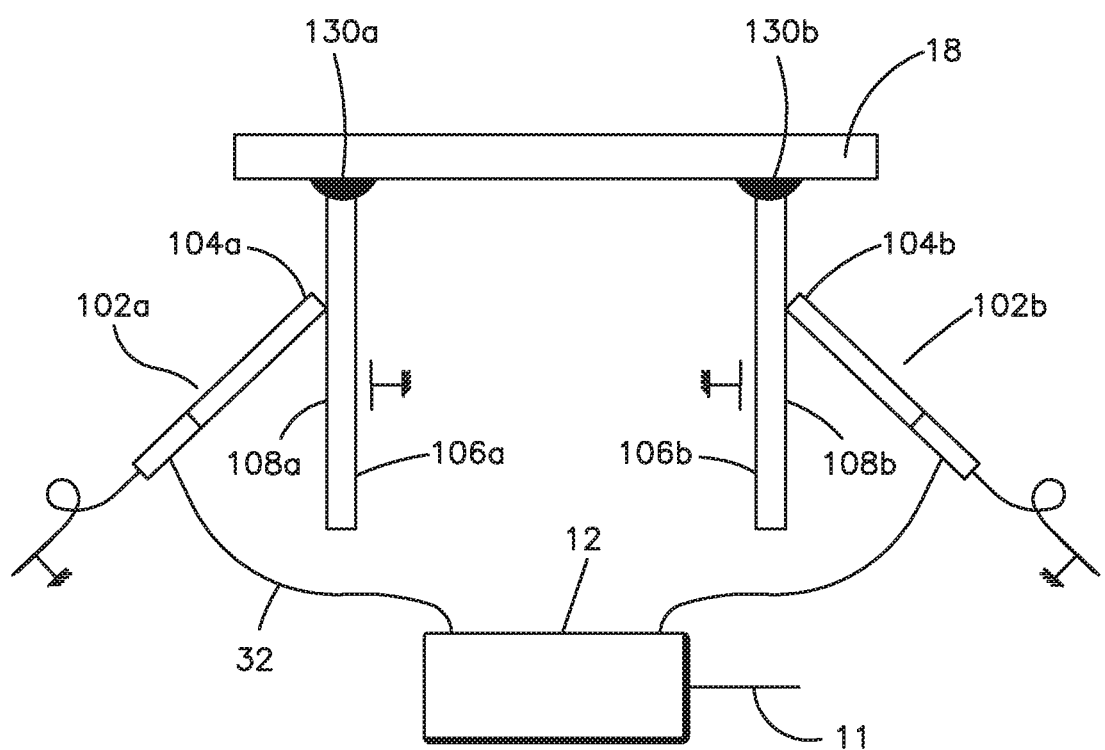
FIG. 4 shows a second embodiment of an adjustment assembly according to the invention.

FIG. 4 shows another adjustment assembly according to the invention. Just like in the example that is shown in FIG. 3, the tilting bearing was left out of the depiction. As the expert skilled in the art would know, any bearing that defines a center of articulation between the glass assembly 18 and the mirror carrier (not shown in FIG. 4) is suitable for executing the invention. The glass assembly 18 is therefore essentially connected to the mirror carrier via a bearing also not shown here.

Two coupling pins 106a, 106b, comparable with the rotors 22 of FIG. 3, are attached to the glass assembly 18, which could be the glass assembly 18 that is shown in FIG. 3. In the shown embodiment, the coupling pins 106a, 106b are attached to the glass assembly 18 by an elastomeric material that absorbs impacts, e.g. movement/shaking of the glass assembly 18, in particular in form of elastomeric connecting pieces 130a, 130b.

As shown in FIG. 4, both coupling pins 106a, 106b comprise a first friction surface 108a, 108b each that essentially extends between a first end and a second end of the coupling pins 106a, 106b and facing to a linear motor 102a and 102b, respectively. The expert skilled in the art would know that another friction surface 108a, 108b could be also employed that only extends on a small region of the coupling pin 106a, 106b, and that does not extend to the first and second ends. Also, the friction surface 108a, 108b could have a concave or convex shape (not shown in FIG. 4).

Also shown in FIG. 4 are the first and second linear motors 102a, 102b as piezo motors, comprising a finger element 104a, 104b each. In the shown example, the first and second linear motors 102a, 102b are arranged at an angle of approximately 45° relative to the first and second coupling pin 106a, 106b, respectively. The skilled person would know that the linear motors 102a, 102b could be also arranged at different angles. The linear motors 102a, 102b could be arranged directly or indirectly, for example by means of a bracket or holder, on the mirror carrier (not shown in FIG. 4).

The finger elements 104a, 104b, could be extended and retracted in a crawling motion so that the first and second coupling pins 106a, 106b can be made to move up and down relative to the respective finger element 104a, 104b that acts on the respective friction surface 108a, 108b of the first and second coupling pins 106a, 106b. Therefore, the finger elements 104a, 104b could have a slight curvature. The individual step sizes could be adjusted by the geometry of the friction elements used in the friction surfaces 108a, 108b.

The two coupling pins 106a, 106b could be arranged on the glass assembly 18 at a similar position than the two linear motors that are shown in FIG. 3, such that actuation of the finger elements 104a, 104b can bring about any desired positioning.

Also, just like in the embodiment that is shown in FIG. 3, both linear adjusting motors 102a, 102b can be actuated by means of contacting and connection to a controller 12. The electrical connection 32, controller 12 and connection 11 to the vehicle could essentially correspond to the respective components that are shown in FIG. 3.

Figure 5A:
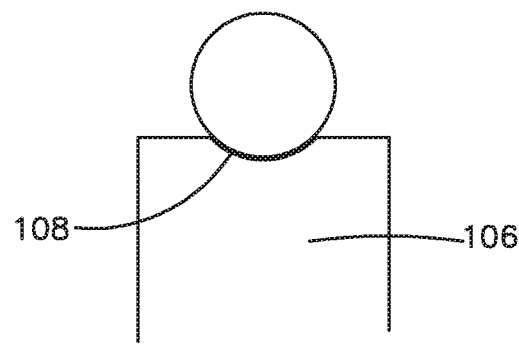
FIG. 5a shows a cross-section of a finger element cooperating with a coupling pin of the adjustment assembly according to FIG. 4, whereas FIGS. 5b and 5c each shows another section between a finger element and a coupling pin in the region of the friction surface thereof.

The engagement of the finger elements with the coupling pins, in particular the friction surfaces thereof, is further illuminated in the following by making reference to FIGS. 5a to 5c. In particular, FIG. 5a shows a cross-section of a coupling finger 104 engaging the friction surface 108 of the coupling pin 106, with the friction surface 108 being substantially in form of a rail, and the friction surface and the substantially circular cross-section of the finger being complementary to each other. Thus, the friction surface 108 has a concave cross-sectional shape.

Figure 5B:
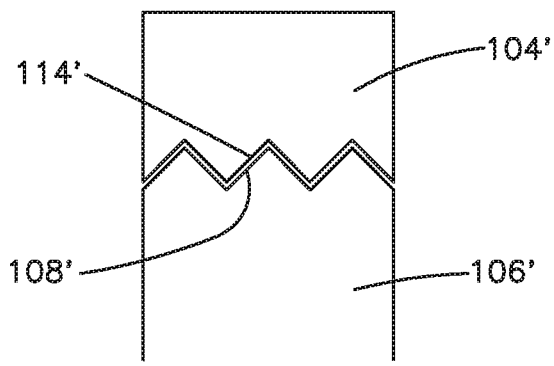
Figure 5C:
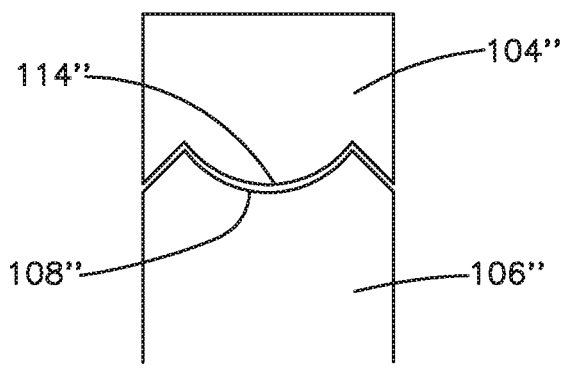

There are various possibilities for the complementary shape of the friction surface of the coupling pin and the end of the finger element, as can be seen from FIGS. 5b and 5c, each depicting a cross-section of a finger element 104' to 104" with a finger element end 114' to 114" engaging a friction surface 108' to 108". It lies within the knowledge of a skilled person to select any suited design.

Figure 6:
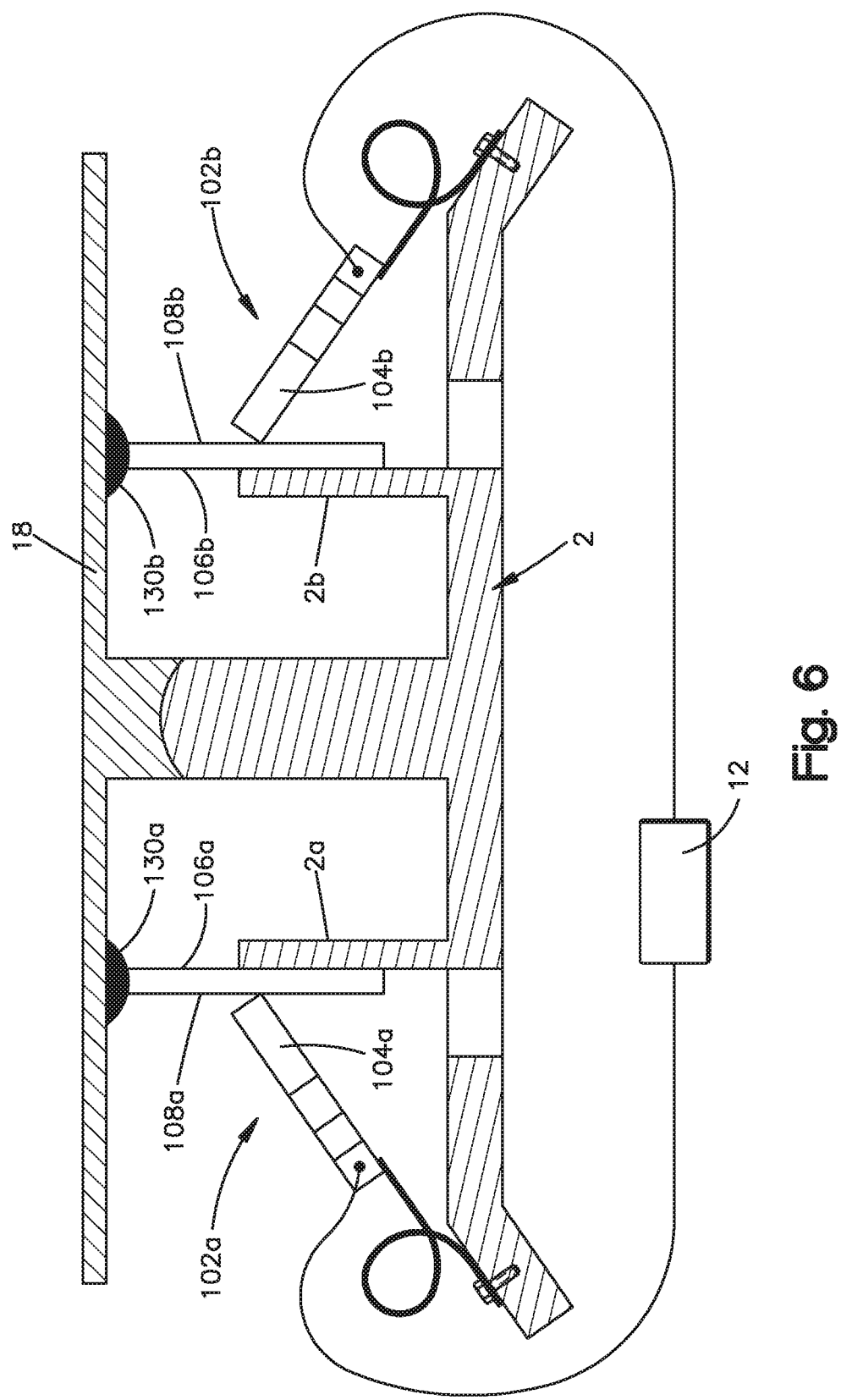
FIG. 6 shows a third embodiment of an adjustment assembly according to the invention.
Figure 7A:
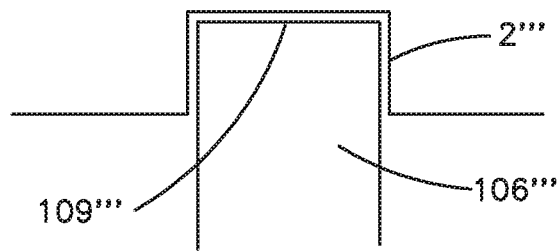
FIG. 7a shows a cross-section of a finger element of the adjustment assembly according to FIG. 6 with a mirror carrier element, whereas FIGS. 7b, 7c, and 7d each shows another section between a finger element and a mirror carrier element.
Figure 7B:
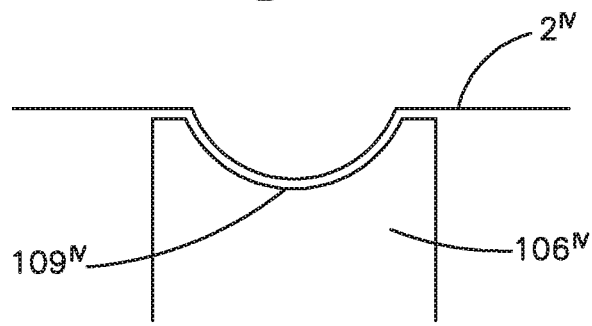
Figure 7C:
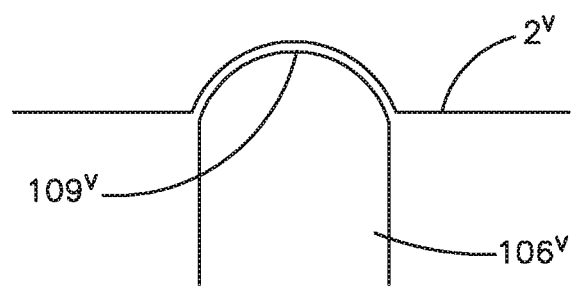
Figure 7D:
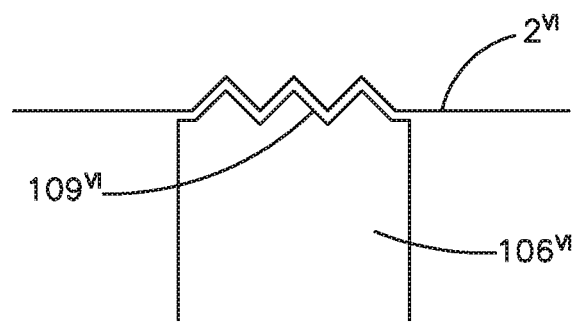

FIG. 6 shows a still further adjustment assembly according to the invention, which corresponds substantially to the assembly as shown in FIG. 4. However, the mirror carrier 2 is further detailed, in particular in the region of the first and second coupling pins 106a, 106b. In fact, the carrier 2 comprises carrier elements 2a and 2b cooperating with the coupling pins 106a, 106b by acting as counter bearings during the crawling motion described with reference to FIG. 4.

There are various possibilities for the complementary shape of the bearing surface $109^{III}$ to $109^{VI}$ and the of the coupling pins $106^{III}$ to $106^{VI}$, as can be seen from FIGS. 7a to 7d, each depicting a cross-section of a carrier element $2^{III}$ to $2^{VI}$ with a coupling pins $106^{III}$ to $106^{VI}$ engaging a bearing surface $109^{III}$ to $109^{VI}$. It lies within the knowledge of a skilled person to select any suited design.

The invention claimed is:

1. An adjustment assembly in an external rearview device for a vehicle comprising:
    a head comprising a subassembly and a carrier, wherein the subassembly comprises a glass, a display or a display subassembly; and
    at least two linear adjusting motors acting on at least two points of the subassembly,
    wherein the adjusting motors are positioned between the subassembly and the carrier in the head,
    wherein the adjustment assembly adjusts the subassembly further comprising at least a first coupling pin and a second coupling pin being connected to the subassembly via at least one at least partly elastomeric connection piece,
    wherein a first end of the first coupling pin and a first end of the second coupling pin are attached to the two points of the subassembly to enable the two linear adjusting motors to act on the two points,
    wherein the first linear adjusting motor acts on a first friction surface arranged on the first coupling pin, and the second linear adjusting motor acts on a second friction surface arranged on the second coupling pin,
    wherein the friction surfaces are arranged on the coupling pins in a longitudinal direction of the coupling pins between the first end and a second end of the coupling pins, and
    wherein the first and second linear adjusting motors are arranged in a diagonal direction relative to the coupling pins.

2. The adjustment assembly according to claim 1, wherein the coupling pins and the linear adjusting motors provide a first friction joint for frictional engagement between the first linear adjusting motor and the first coupling pin and a second friction joint for frictional engagement between the second linear adjusting motor and the second coupling pin.

3. The adjustment assembly according to claim 1, wherein the adjusting motors are piezo motors.

4. The adjustment assembly according to claim 1, wherein the linear adjusting motors each comprise at least one finger element that is a spring biased finger element, and each finger element is adapted to act on the friction surface of the respective coupling pin for moving the first and second coupling pin up or down relative to the mirror carrier.

5. The adjustment assembly according to claim 1, wherein each friction surface comprises at least one friction element.

6. The adjustment assembly according to claim 5, wherein the friction element fulfills the function of a guiding element in form of a rail.

7. The adjustment assembly according to claim 1, wherein each friction surface and the respective coupling pin end have complementary shapes to engage each other.

8. The adjustment assembly according to claim 1, wherein the friction surface has at least one of a concave shape, convex shape and saw tooth.

9. The adjustment assembly according to claim 1, wherein the adjusting motors are actuated using a controller built into the external rearview device.

10. The adjustment assembly according to claim 9, wherein the controller is part of a vehicle electrical routing bus system.

11. The adjustment assembly according to claim 1, wherein the subassembly comprises the glass and the display subassembly having a plastic substrate with a reflecting layer.

12. The adjustment assembly according to claim 1, wherein the subassembly comprises the glass and the display subassembly having a plastic carrier plate with a mineral mirror glass.

13. The adjustment assembly according to claim 1, wherein the carrier provides a counter bearing surface for each coupling pin.

14. The adjustment assembly according to claim 13, wherein each counter bearing surface is provided by a carrier element arranged on the side of the respective coupling pin opposite the respective linear adjusting motor.

* * * * *